United States Patent
Nero, Jr. et al.

(10) Patent No.: US 11,143,588 B1
(45) Date of Patent: Oct. 12, 2021

(54) OPEN PATH GAS DETECTOR WITH SYNCHRONOUS FLASH DETECTION

(71) Applicant: MSA Technology, LLC, Cranberry Township, PA (US)

(72) Inventors: Regis J. Nero, Jr., Trafford, PA (US); David M. Gherardi, Broadstone (GB)

(73) Assignee: MSA Technology, LLC, Cranberry Township, PA (US)

(*) Notice: Subject to any disclaimer, the term of this patent is extended or adjusted under 35 U.S.C. 154(b) by 2 days.

(21) Appl. No.: 16/835,826

(22) Filed: Mar. 31, 2020

(51) Int. Cl.
| | |
|---|---|
| *G01N 21/35* | (2014.01) |
| *G01N 21/3504* | (2014.01) |
| *H01J 61/16* | (2006.01) |
| *G01N 21/31* | (2006.01) |

(52) U.S. Cl.
CPC .......... *G01N 21/3504* (2013.01); *H01J 61/16* (2013.01); *G01N 2021/3196* (2013.01); *G01N 2021/3513* (2013.01)

(58) Field of Classification Search
CPC .......... G01N 21/6408; G01N 21/6428; G01N 21/8483; G01N 2800/16; G01N 2800/162; G01N 2800/52; G01N 2800/7095; G01N 33/6893; G01N 2021/8809; G01N 25/72; G01N 21/8806; H01J 2237/04; H01J 2237/31701; H01J 2237/31737;

(Continued)

(56) References Cited

U.S. PATENT DOCUMENTS

| | | | |
|---|---|---|---|
| 4,264,209 A | 4/1981 | Brewster | |
| 5,202,570 A | 4/1993 | Tanaka et al. | |
| 5,401,967 A | 3/1995 | Stedman et al. | |

(Continued)

FOREIGN PATENT DOCUMENTS

| | | |
|---|---|---|
| CN | 105122038 | 9/2018 |
| DE | 4324118 C2 | 1/1996 |

(Continued)

OTHER PUBLICATIONS

Schriever, C., et al., "A novel ultra-broadband transient spectrometer with microsecond measurement range based on a supercontinuum fiber laser," Appl Phys B (2009) 96:247-250.

(Continued)

*Primary Examiner* — Michael P Stafira
(74) *Attorney, Agent, or Firm* — Larry K. Roberts

(57) ABSTRACT

An open path gas detector for detecting the presence of a target gas in the presence of fog or water vapor. A transmitter transmits flashes of optical energy along a path in an area under surveillance, including energy at a sample wavelength region at which the target gas is absorbed, at a reference wavelength region not significantly absorbed by the target gas, and at a synchronization wavelength region different from the first and second wavelengths. A receiver includes a sample channel responsive to the optical energy at the sample wavelength region, a reference channel responsive to optical energy at the reference wavelength region, and a third synchronization channel responsive to the optical energy at the synchronization wavelength region. The receiver detects the target gas and synchronizes operation of the receiver to the transmitter flashes of optical energy using the output of the synchronization channel.

20 Claims, 12 Drawing Sheets

Receiver Signal Chain

(58) Field of Classification Search
CPC ..... H01J 2237/3174; H01J 2237/31749; H01J 37/04; H01J 37/3007; H01J 37/3174
See application file for complete search history.

(56) References Cited

U.S. PATENT DOCUMENTS

| | | | |
|---|---|---|---|
| 6,455,854 B1 | 9/2002 | Richman | |
| 6,545,278 B1* | 4/2003 | Mottier | G01J 3/42 |
| | | | 250/339.12 |
| 7,705,988 B2 | 4/2010 | Richman | |
| 9,207,170 B2 | 12/2015 | Trollsch | |
| 2003/0206325 A1 | 11/2003 | Sachse et al. | |
| 2003/0228143 A1* | 12/2003 | Yano | H05B 41/325 |
| | | | 396/159 |
| 2010/0027004 A1 | 2/2010 | Bonyuet et al. | |
| 2014/0124672 A1* | 5/2014 | Stock | G01N 21/15 |
| | | | 250/343 |
| 2015/0373285 A1* | 12/2015 | Morris | G01J 3/28 |
| | | | 250/252.1 |
| 2019/0145891 A1* | 5/2019 | Waxman | G01J 3/0208 |
| | | | 356/409 |
| 2019/0212261 A1* | 7/2019 | Lannestedt | G01J 3/0208 |

FOREIGN PATENT DOCUMENTS

| | | |
|---|---|---|
| EP | 2946194 A1 | 11/2015 |
| GB | 2497296 A | 6/2013 |
| WO | WO02082059 A1 | 10/2002 |
| WO | WO 2006127722 A2 | 5/2006 |
| WO | WO 2009034296 A1 | 3/2009 |
| WO | WO02014113287 A1 | 7/2014 |

OTHER PUBLICATIONS

International Search Report and Written Opinion, International Application PCT/US2021/024726, dated Jun. 18, 2021.

* cited by examiner

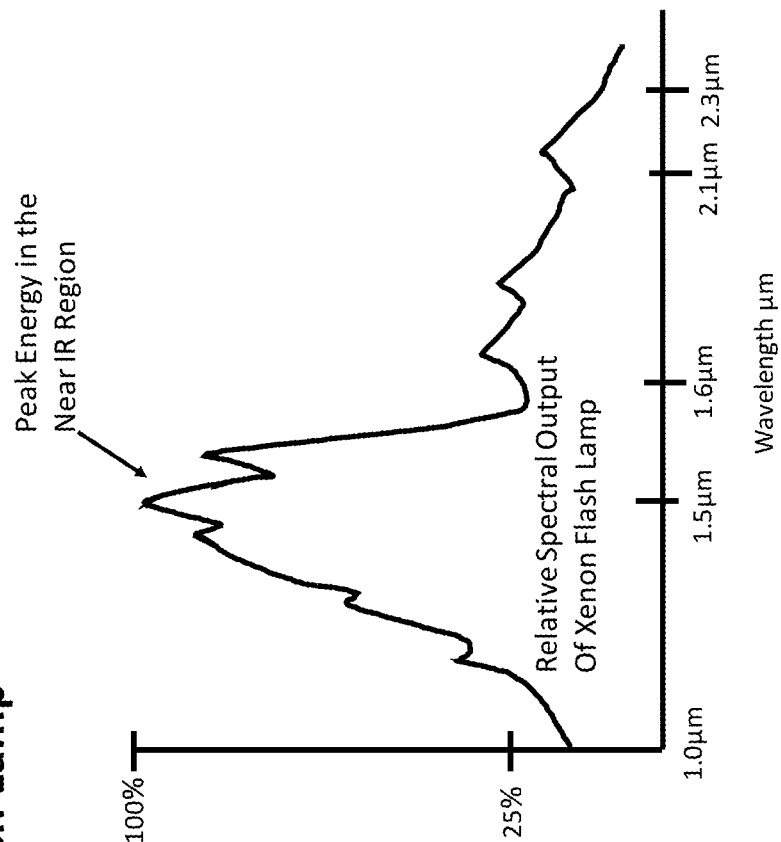
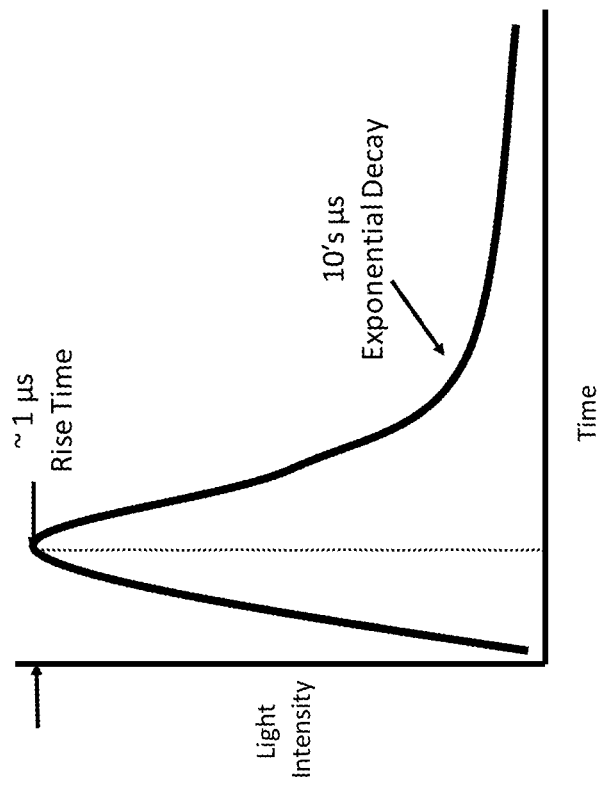

OPEN PATH GAS DETECTOR WITH SYNCHRONOUS FLASH DETECTION

BACKGROUND

Open path gas detectors are in use today for detecting target gasses such as hydrocarbon gases. Such detectors include a transmitter for transmitting infrared energy along a path in an area under surveillance, and a receiver for receiving the transmitted energy. If hydrocarbon gases are present in the path, the energy is absorbed at wavelengths specific to the gas type, for example at 2.3 um. The receiver determines whether the gas is present by detecting attenuation at the specific frequency, typically in relation to a reference channel. In many detectors, the transmitter is flashed at a given rate with a low duty cycle.

The path length can be quite large, e.g. tens or hundreds of meters. Alignment of the transmitter and receiver is a concern. Another concern is uptime or useful detector operation during adverse weather conditions such as fog or dust storms. At some point, the fog or dust density typically forces an open path infrared detector offline, i.e. reducing uptime. This invention is directed to the problem of improving detector uptime in adverse environmental conditions.

BRIEF DESCRIPTION OF THE DRAWINGS

Features and advantages of the disclosure will readily be appreciated by persons skilled in the art from the following detailed description when read in conjunction with the drawing wherein:

4A and 4B illustrate the flash characteristics of a xenon flash lamp. FIG. 4A illustrates the light intensity of a typical pulse as a function of time, while FIG. 4B depicts the spectral content of the flash.

DETAILED DESCRIPTION

Figure 1:
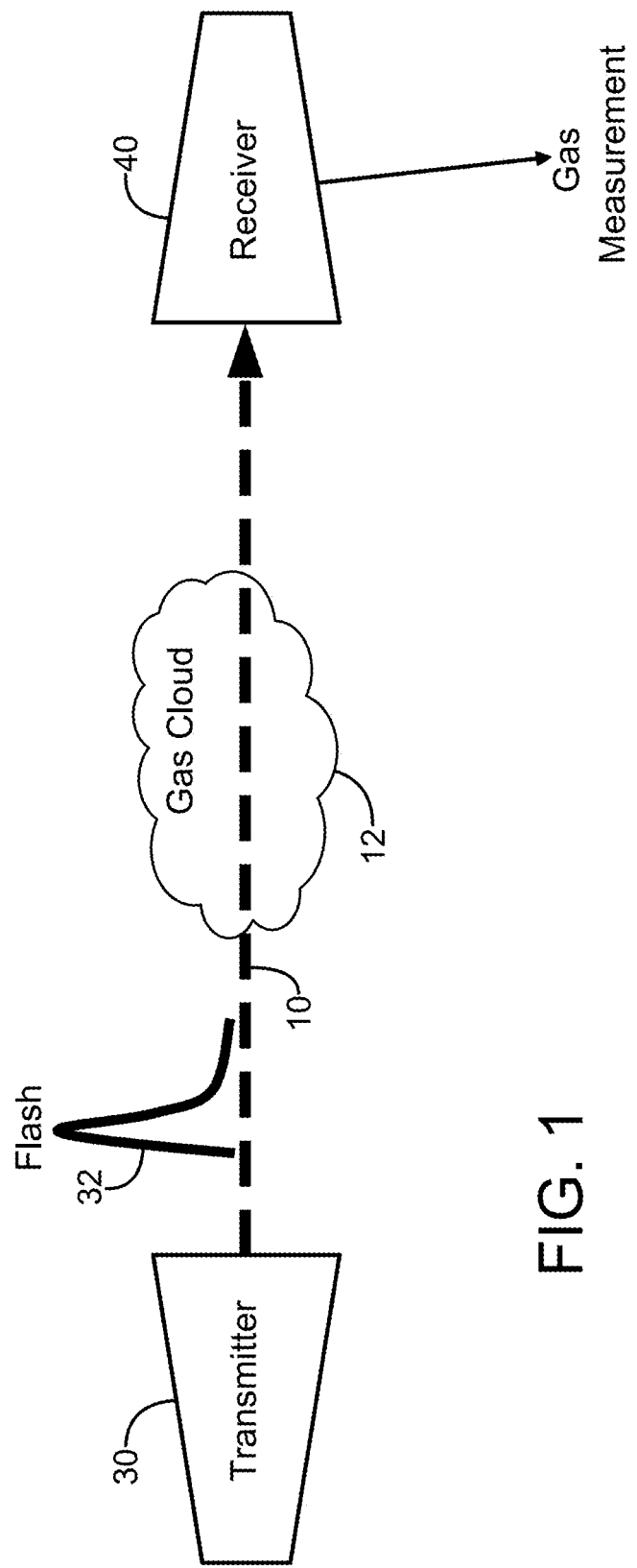
FIG. 1 is a schematic diagram of a typical open path detector used to measure or detect the presence of a target gas such as methane in a monitored path.

In the following detailed description and in the several figures of the drawing, like elements are identified with like reference numerals. The figures are not to scale, and relative feature sizes may be exaggerated for illustrative purposes.

A typical open path detector as shown in FIG. 1 includes a transmitter module 30 which transmits an optical flash 32, and a receiver module which receives the transmitted flash. If the target gas 12 is within the monitored path 10 of the detector, the optical spectrum at the receiver module will change due to IR absorption by the target gas. The IR absorption band is typically spectrally narrow, so changes in this region compared to a nearby band indicate the presence and quantity of gas.

The spectral region where the target gas absorbs IR is called the Sample spectral region. The nearby spectral region unaffected by the target gas is called the Reference spectral region. The ratio of Sample to Reference signals determined the presence and quantity of gas. When there is no target gas in the monitored path, the Sample and Reference signal levels tend to vary the same as the received flash signal varies due to such thing as adverse environmental conditions, dirty optics, aging flashlamp, etc.

In an exemplary embodiment, the reference wavelength is selected to be as close to the sample wavelength as possible but outside of the gas absorption wavelength. In reality each specific gas can have a complex or simple absorption line(s) so reference may be slightly affected by the gas and this would be removed during calibration. The gas calculation is still Sample divided by Reference.

Figure 2:
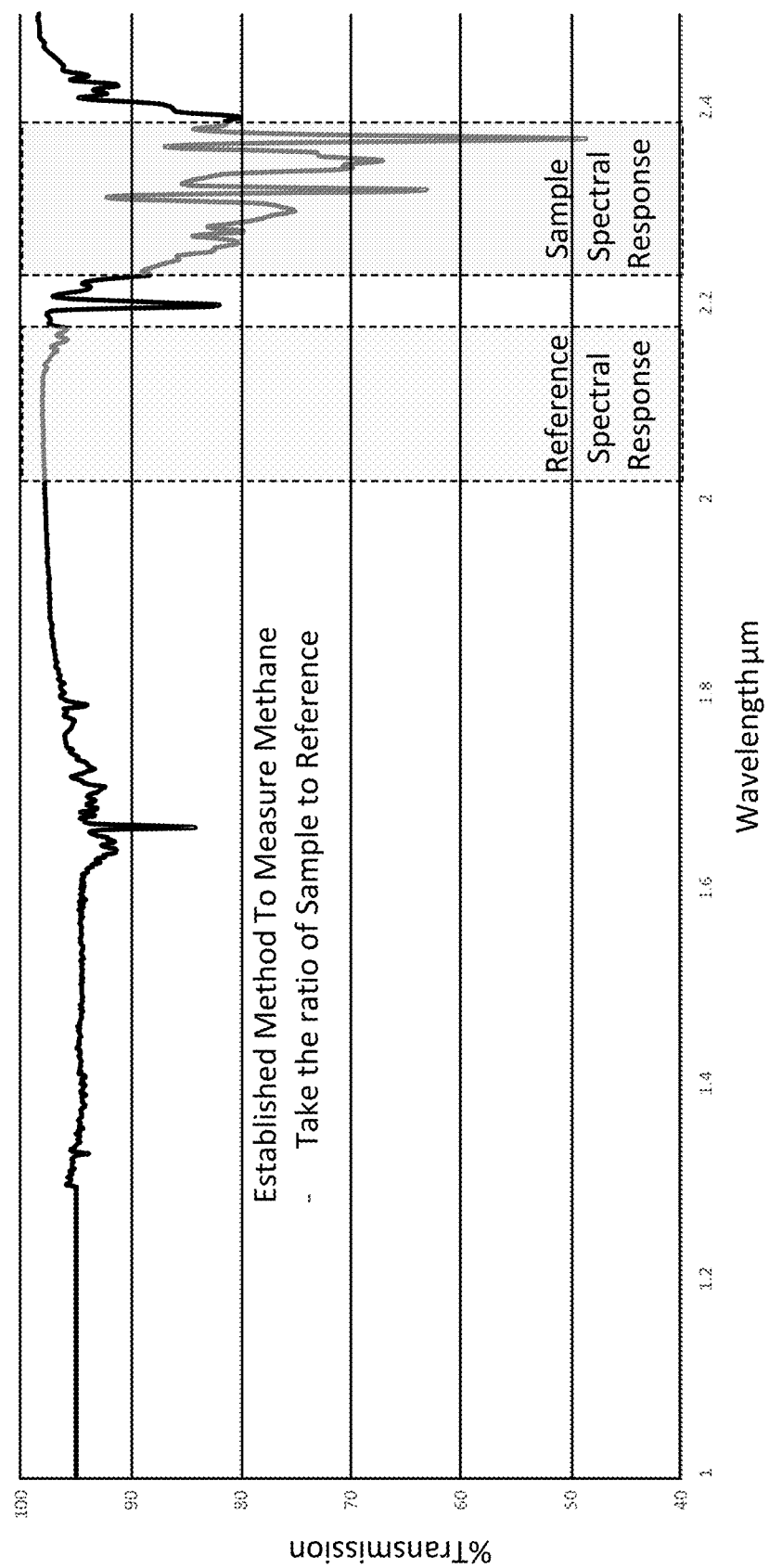
FIG. 2 is a diagram showing the absorption profile of methane near 2.3 um along with the spectral location for signals that could be used to measure the gas.

FIG. 2 depicts how methane, a typical target gas, absorbs near the 2.3 um spectral region, the Sample spectral signal, while a nearby 2.1 um Reference spectral signal does not fall within the IR absorption band of methane. The 2.3 um spectral region is considered the Sample spectrum and is an approximation as each type of hydrocarbons has a very specific absorptions profile near 2.3 um.

Likewise, the 2.1 um Reference signal is an approximation and represent a wavelength near but outside the target gas absorption spectrum. The change in ratio between the Sample and Reference signals indicates the presence and also the quantity of gas in the monitored path. Using a ratio method between Sample and Reference is a well-established practice.

Figure 3:
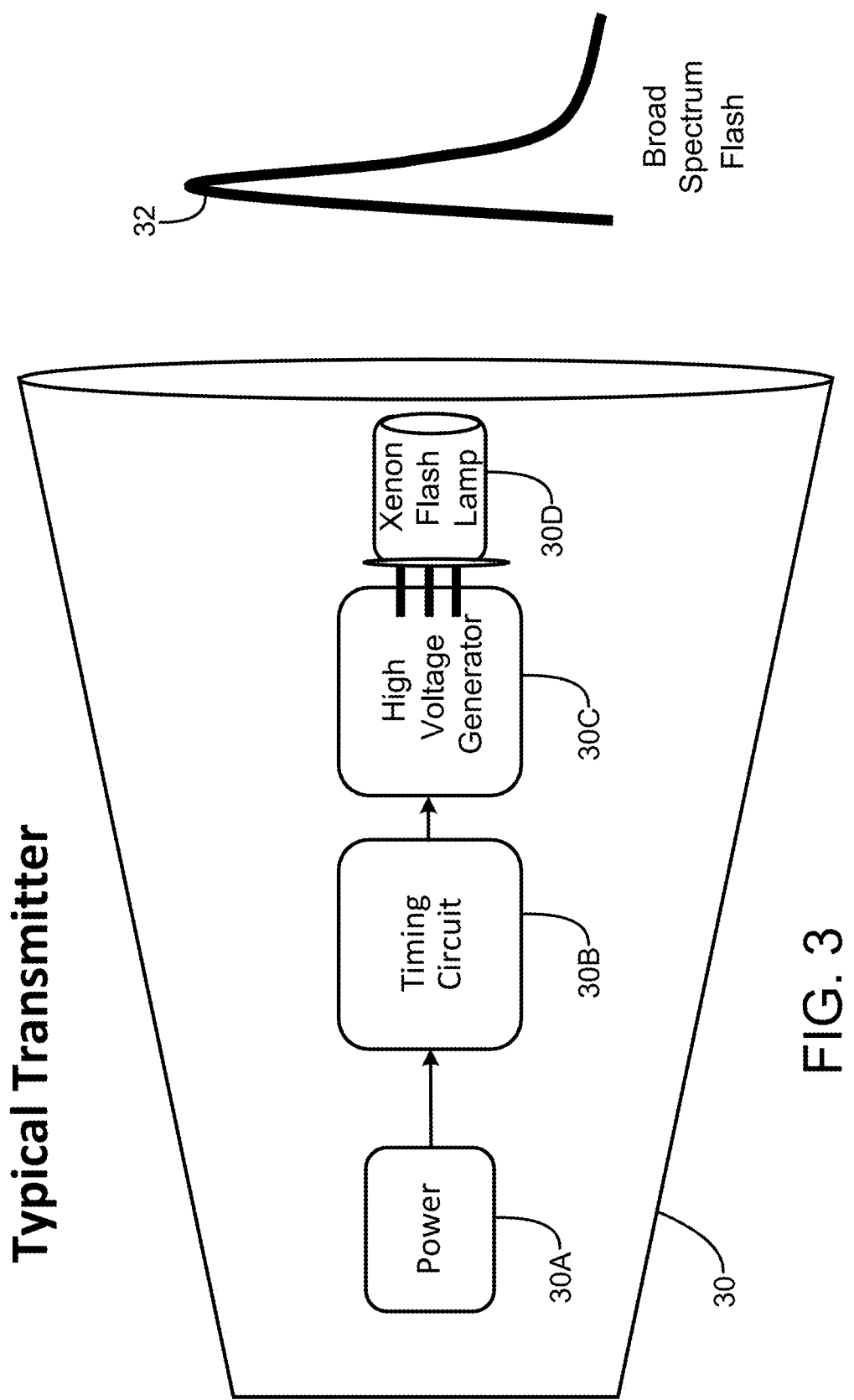
FIG. 3 is a block diagram of an OPIR Transmitter using a xenon Flash Lamp.

FIG. 3 shows a typical open path detector transmitter module 30 utilizing a xenon flash lamp 30D to produce a broad-spectrum flash 32. "Broad" spectrum in the context of the transmitter flash in this exemplary embodiment refers to wavelengths from UV to infrared, or ~0.2 um to 4 um. The transmitter module includes a power circuit 30A, a timing circuit 30B, and a high voltage generator circuit 30C, which drives the flash lamp.

FIGS. 4A and 4B illustrate the flash characteristics of a xenon flash lamp. FIG. 4A illustrates the light intensity of a typical pulse as a function of time, while FIG. 4B depicts the spectral content of the flash.

Figure 5:
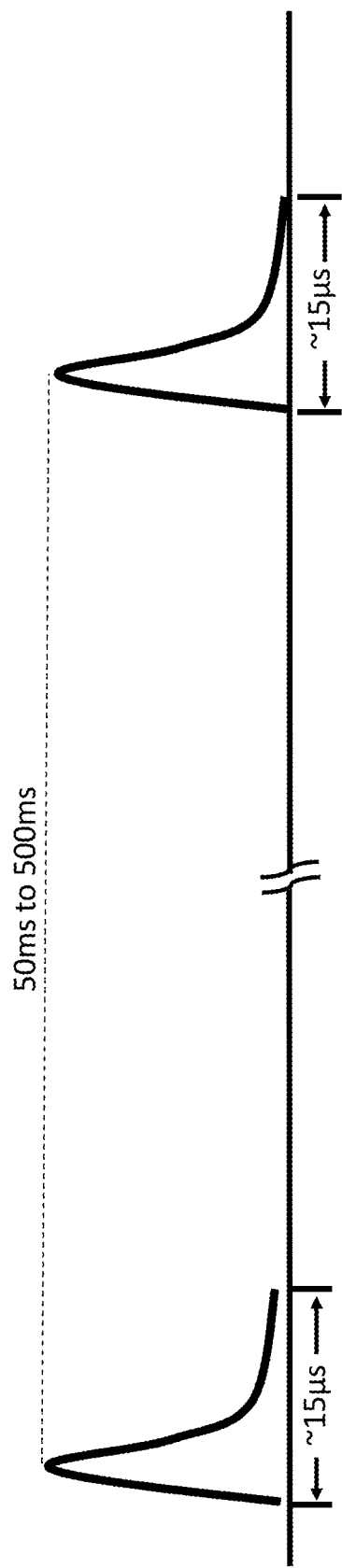
FIG. 5 graphically illustrates the range of flash rates that can be used in a typical OPIR transmitter.

FIG. 5 shows that while the flash of a typical open path detector is short in duration, the time between flashes is relatively long. This translates into a very low duty cycle flash period which makes synchronization at the detector receiver difficult when signal levels become severely attenuated, thus very noisy during adverse environmental conditions such as heavy fog.

One method used to increase signal levels is via averaging where N values are added together, and the sum is then divided by N to obtain the mean of the signal. If the signals are a waveform then by synchronizing to a specific point of the waveform such as the fast-rising edge of the transmitter flash, time synchronous averaging can be performed.

Synchronous averaging is a well-established technique for average signals in the time domain but requires a synchronous signal with a precise time relation to the signals that are to be averaged. Open path detectors available today perform synchronous averaging but are limited by the lack of a precise synchronous signal.

Synchronous averaging can include "time synchronous averaging," "complex averaging," "time domain averaging," and "vector averaging." They all require a synchronous signal, which provided by a Synchronization signal in accordance with aspects of the invention.

One conventional method used to synchronize has the receiver synchronize to the transmitter flash by tracking time between flashes. This requires a fixed flash rate and low drift clocks on both ends. Even with this, the receiver time base will never exactly match the transmitter time base so drift over time is inevitable. When long term adverse environmental conditions cause the received flash to be severely attenuated and nearly undetectable, the receiver is likely to lose synchronization just when time synchronous averaging is most needed for the system to stay operational.

Another conventional method used to synchronize in some open path detectors require a cable to be connected between the transmitter and receiver modules so that the transmitter can send an electrical signal when it flashes. This has the known disadvantage that signal propagation time from the transmitter to receiver is dependent upon the length of the cable, the type of cable and even such things as water ingress into the cable. This method impacts installation cost as it requires a cable to be installed between the transmitter and receiver, requires a costly signal quality cable, requires recording an accurate measurement of the cable length and requires conduit to keep water out of the cable. Because a flash propagating through free space will be faster than an electrical signal propagating down a cable, there will be small timing errors introduced that will degrade the noise reduction benefits of precise time synchronous averaging.

To increase the uptime of an open path gas detector, the Signal-to-Noise Ratio (SNR) of the system is to be increased. In accordance with aspects of this invention, a technique for synchronizing to the flash of an OPIR transmitter uses an unused portion of the flash spectrum so that precise time synchronous averaging can be used to reduce the noise level of the Sample and Reference signals used to perform the gas measurement, thus increasing the SNR and uptime of the system.

An exemplary embodiment of this invention uses a third signal, called Sync, that is derived from an unused portion of the optical spectrum of the transmitted flash to provide a precise time synchronous signal, particularly in the case in which the detector is operating under adverse environmental conditions, such as fog or a dust storm.

FIGS. 4A and 4B respectively show the time characteristics and spectral output of a typical xenon flash lamp. What is to be noted is that the flash has a fast rise time, on the order of 1 microsecond, with an exponential decay, on the order of 10 microseconds. Also noteworthy is that the spectral output in the Near IR region peaks around 1.5 um and drops off considerably in the 2.3 um region where the gas measurement is made. Other types of light sources may also be employed, if it has a broad spectrum, depending on how the energy is distributed in the spectrum.

The fast rise time and 1.5 um spectral output peak in this exemplary embodiment allow a synchronizing signal to be realized. A third signal called Sync centered at 1.5 um wavelength can be used to generate the signal needed to for synchronization. A Sync optical channel is included in an exemplary receiver embodiment of an open path gas detector.

Figure 6:
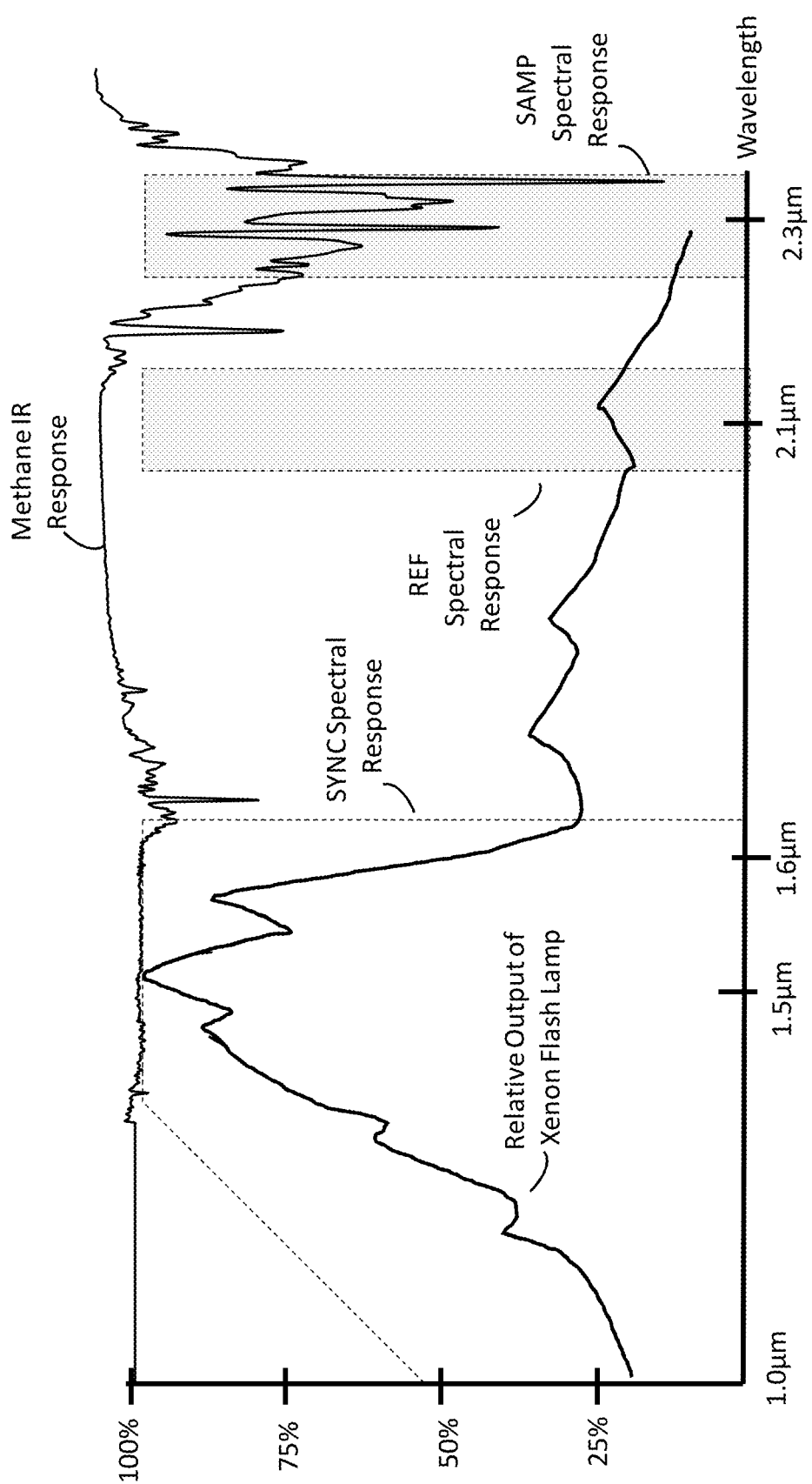
FIG. 6 depicts the spectral response of three signals utilized in an exemplary embodiment of this invention, along with the IR absorption profile of methane gas superimposed on the relative output of a xenon flash lamp.

FIG. 6 shows the spectral response of the three signals used in this exemplary embodiment as they overlap the IR response of methane as well as the spectral output of a typical xenon flash lamp. What can be seen in this figure is that the Sync spectral response, within the dashed line marked "SYNC Spectral Response," overlaps a larger portion of an unused spectrum which gives it an energy level advantage over the Reference and Sample spectral responses which have a limited bandwidth necessary to have a stable gas measurement. The Sync spectral response is determined, in this exemplary embodiment, by the bandwidth of the Sync channel photodiode 40A-2 (FIG. 8), since in this example, there is no optical filter in front of the Sync photodiode. The REF and SAMPLE bandwidths are in the range of 0.05 um to 0.150 um with the actual or exemplary bandwidth selected based upon the specific gas being measured as well as the optical design. In one exemplary embodiment, a nominal bandwidth of 0.10 um may be employed, as the bandwidths of the REF Spectral response and the SAMP Spectral Response as depicted in FIG. 6.

While FIG. 6 illustrates the example in which there is a single REF Spectral response, in other embodiments, the reference wavelength actual may be composed on two wavelengths, on either side of the Sample wavelengths. In this case, there would be two REF spectral responses. In that case, the reference channel optical filter is designed to let in two wavelengths so there is only one reference photodiode. The use of dual reference wavelengths is known in the art, and the reason for its use is that one wavelength would tend to increase and the other decrease, depending upon environmental conditions, providing some balance.

Figure 7:
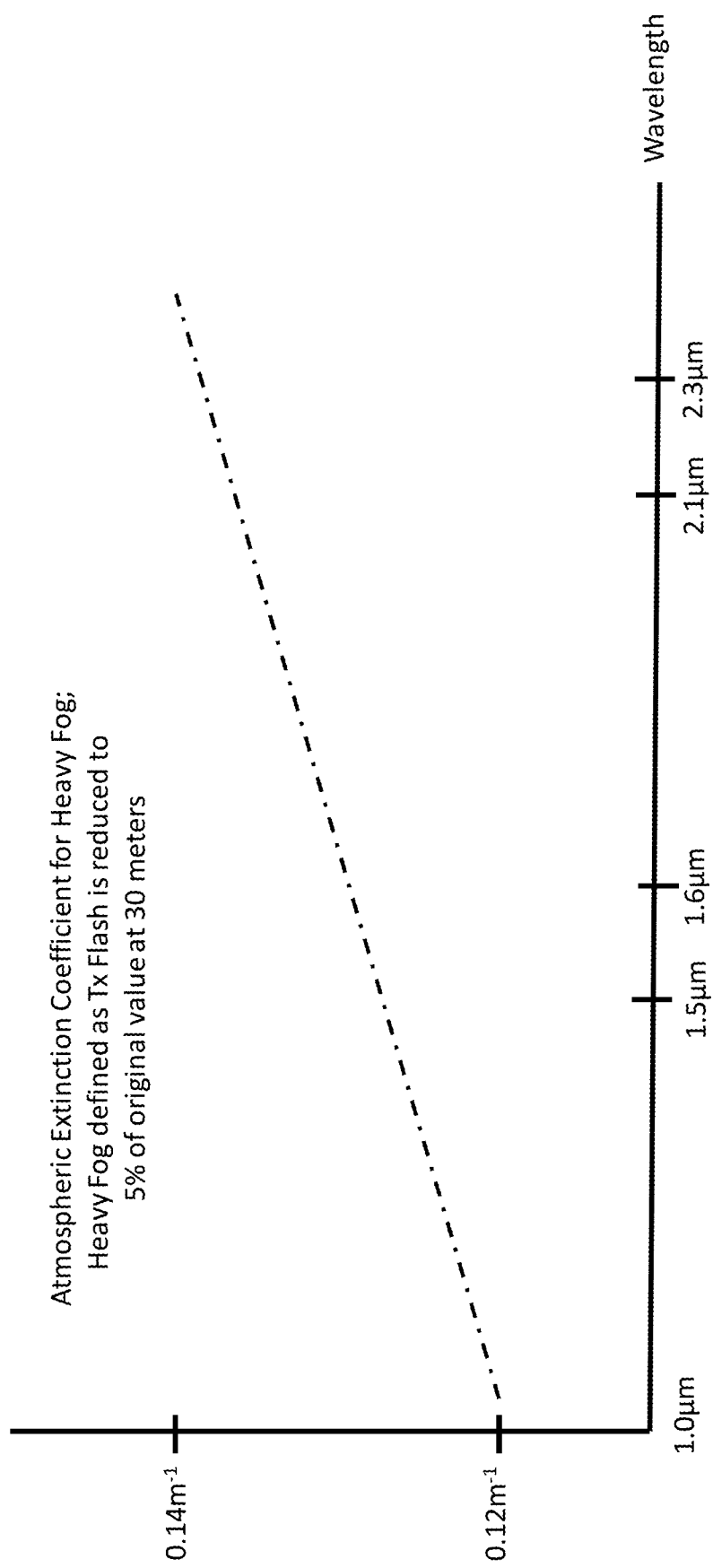
FIG. 7 shows a typical atmospheric extinction coefficient for heavy fog, as a function of wavelength.

Another advantage of using a Sync signal derived from the 1.5 um spectrum is related to how the Near IR spectrum responds to fog. FIG. 7 shows a derived plot of the atmospheric extinction coefficient for heavy fog which reveals that, under certain conditions, the longer wavelengths can be attenuated more so than the shorter wavelengths. This tends to happen more so with a heavier fog than a light fog. Heavy fog is defined as when the transmitter flash is reduced to 5% of its original value at 30 meters.

FIG. 7 implies that light in the 2.3 um region will attenuated more than light in the 1.5 um region under heavy fog conditions. This is just the time a synchronization signal is needed as it is known that open path detectors often go offline when it is foggy and what is really going on is that the 2.3 um region signals are reduced below a point where detection of the received flash becomes unreliable thus preventing a gas measurement from being made. With a 1.5 um Sync signal available for processing by the receiver module, the 2.3 um region can be synchronously averaged, thus increasing the SNR to the point where a reliable gas measurement can be made.

The totality of a larger Sync signal spectral bandwidth (from about 1.0 um to about 1.6 um in the example illustrated in FIG. 6), plus higher output of a Xenon flash lamp in the 1.5 μm region, plus the tendency of heavy fog to reduce light intensity in the 2.3 um region leads to the conclusion that the Sync signal will tend to be the largest signal of the three. Further, the lensing gains for the Sync optical path and the Sample and Reference optical paths may further support this conclusion. Lensing gain refers to the light gathering capability of an objective lens. The larger the lens the more light that it can gather. 40A-1 and 40A-3 (FIG. 8) are objective lenses that capture light for the photodiodes.

Figure 8:
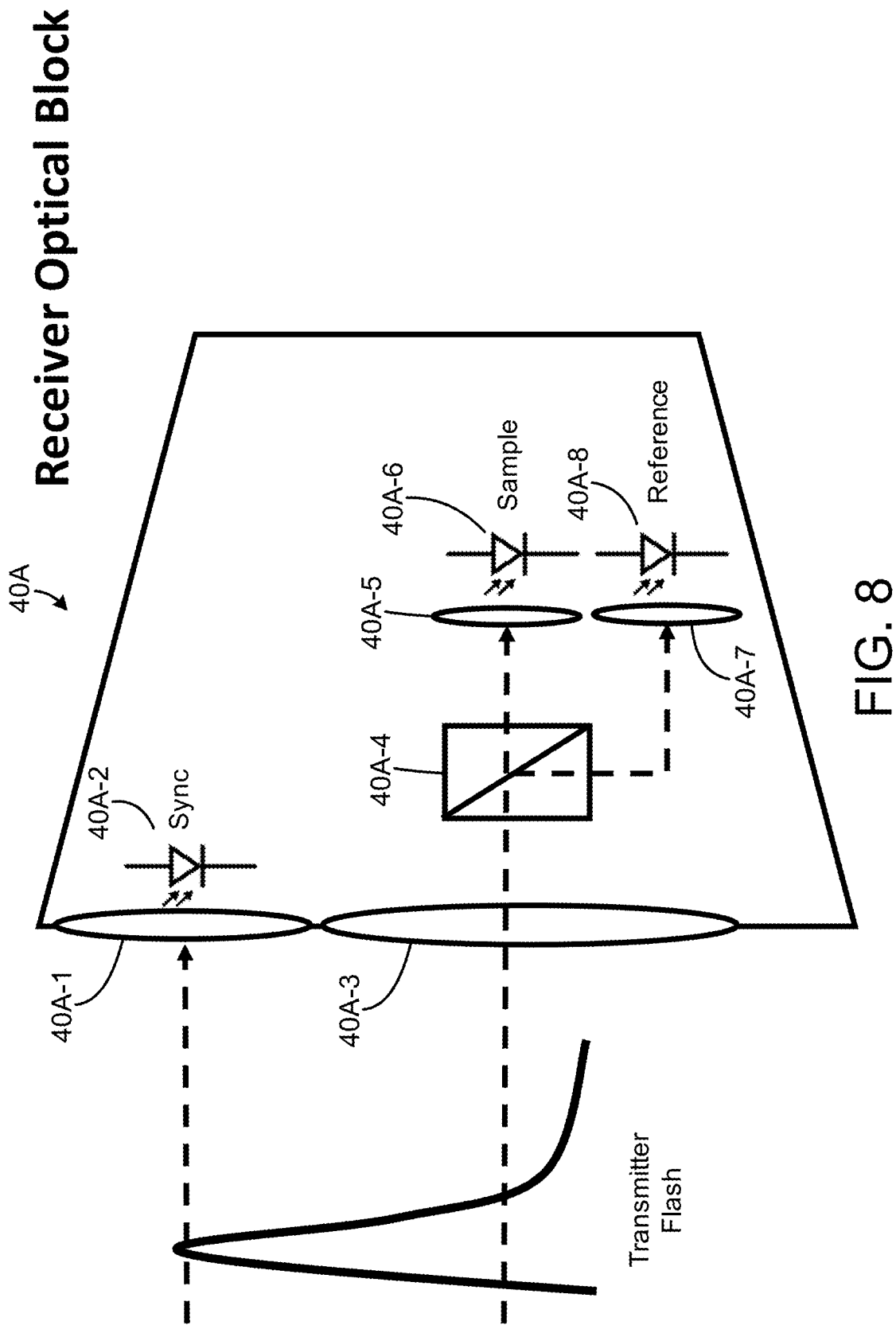
FIG. 8 is a simplified schematic block diagram of an exemplary embodiment of a receiver optical block for an OPIR detector in accordance with aspects of the invention.

Even though in this exemplary embodiment, the sync lens 40A-1 is smaller than the Sample and Reference Lens 40A-3 as illustrated in FIG. 8, other factors such as spectral flash intensity, optical bandwidths, beam splitting and atmospheric extinction still indicate the Sync signal is larger than the Sample and Reference signals.

A separate SYNC channel is included in the receiver module so as to provide synchronous flash detection that triggers data acquisition of the Sample and Reference signals for subsequent averaging even when the measurement signals are too noisy to be reliably detected on their own.

FIG. 8 shows an exemplary embodiment of a receiver optical block or module 40A that implements the optical elements of the receiver.

Sync Lens 40A-1 captures and focuses the received flash signal on to the Sync photodiode 40A-2.

Sync Photodiode 40A-2 converts photons to electrons in the 1.5 um region to generate the Sync signal that is used to detect a transmitter flash. As previously noted, there is no optical filter in front of lens 40A-1. The spectral bandwidth of the SYNC channel is set by the spectral response of the selected photodiode. In an exemplary embodiment, a photodiode design is selected to operate in the 1.5 um region.

Main lens 40A-3 captures and focuses the received flash signal onto the beam splitter 40A-4.

Beam Splitter 40A-4 splits the received flash signal into a Sample path and a Reference path.

Sample Optics 40A-5 includes an optical filter which blocks out all but the Sample spectrum for the Sample photodiode. Sample optics 40A-5 represent several optical components including the optical filter, as well as a field lens.

Sample Photodiode 40A-6 converts photons to electrons to generate the Sample signal. The photodiode design is selected to operate in the 2.3 um region in this embodiment.

Reference Optics 40A-7 includes an optical filter which blocks out all but the reference spectrum for the reference photodiode. As with the sample optics, the reference optics represents several optical components, including the optical filter as well as a field lens.

Reference Photodiode 40A-8 converts photons to electrons to generate the Reference signal. The same photodiode design as the sample photodiode design may be employed, in this exemplary embodiment.

Figure 9:
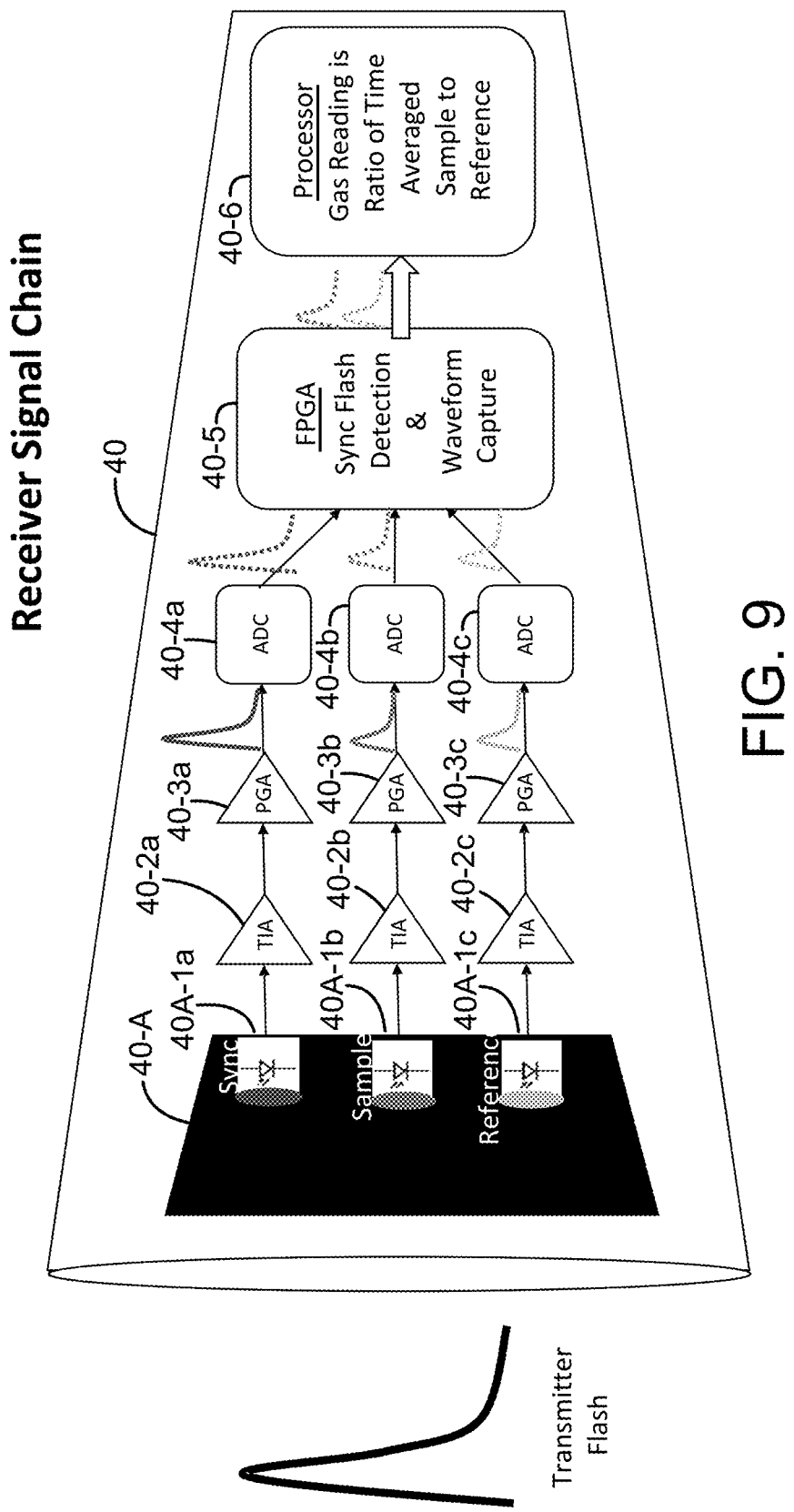
FIG. 9 is a schematic diagram illustrating an exemplary embodiment of receiver signal processing implemented by the embodiment of FIG. 8.

FIG. 9 is a schematic diagram of an exemplary embodiment of a receiver module 40 in accordance with aspects of the invention. FIG. 9 illustrates an optical block 40-A with an exemplary receiver signal chain and processing that leads to a gas measurement using the Sync signal for synchronous flash detection.

The Sync signal is used to detect the occurrence of a transmitter flash and thus synchronize the receiver measurements to the transmitter flash. The Sample signal responds strongly to the presence of hydrocarbons in the monitored path. The Reference signal ideally does not change with the presence of hydrocarbons in the monitored path and is located spectrally close to the Sample spectrum. The ratio of Sample to Reference signals determines the quantity of hydrocarbons in the monitored path.

Following are descriptions of the components in FIG. 9.

Sync Photodiode 40A-1a detects energy in the 1.5 um region and used to detect a transmitter flash so that synchronous averaging can be performed on the sample and reference signals.

Sample Photodiode 40A-1b detects energy in the Sample region which is where a target gas has a strong IR absorption line.

Reference Photodiode 40A-1c detects energy in the reference region which is near the target gas IR absorption line but not affected by the target gas.

Amplifiers 40-2a, 40-2b, 40-2c (TIA) are transimpedance amplifiers that convert the photodiode current to a voltage.

Amplifiers 40-3a, 40-3b, 40-3c (PGA) are programmable Gain Amplifiers for amplifying the analog signals, providing additional gain to signals within range of the ADC (analog-to-digital converter).

ADCs 40-4a, 40-4b, 40-4c are analog to digital converters.

FPGA 40-5 is a field programmable gate array (FPGA), which provides a flash correlation function and synchronously captures waveforms when a flash is detected.

Processor 40-6 performs, in this exemplary embodiment, time averaging of the Sample and Reference signals and calculates the gas measurements based upon the ratio of the Sample to Reference signals. The processor may be implemented by a microprocessor or microcomputer with memory in an exemplary embodiment. Other processor implementations may be implemented as well. At least the processor functions may be implemented remotely from the receiver, e.g. at a central station.

Figure 10:
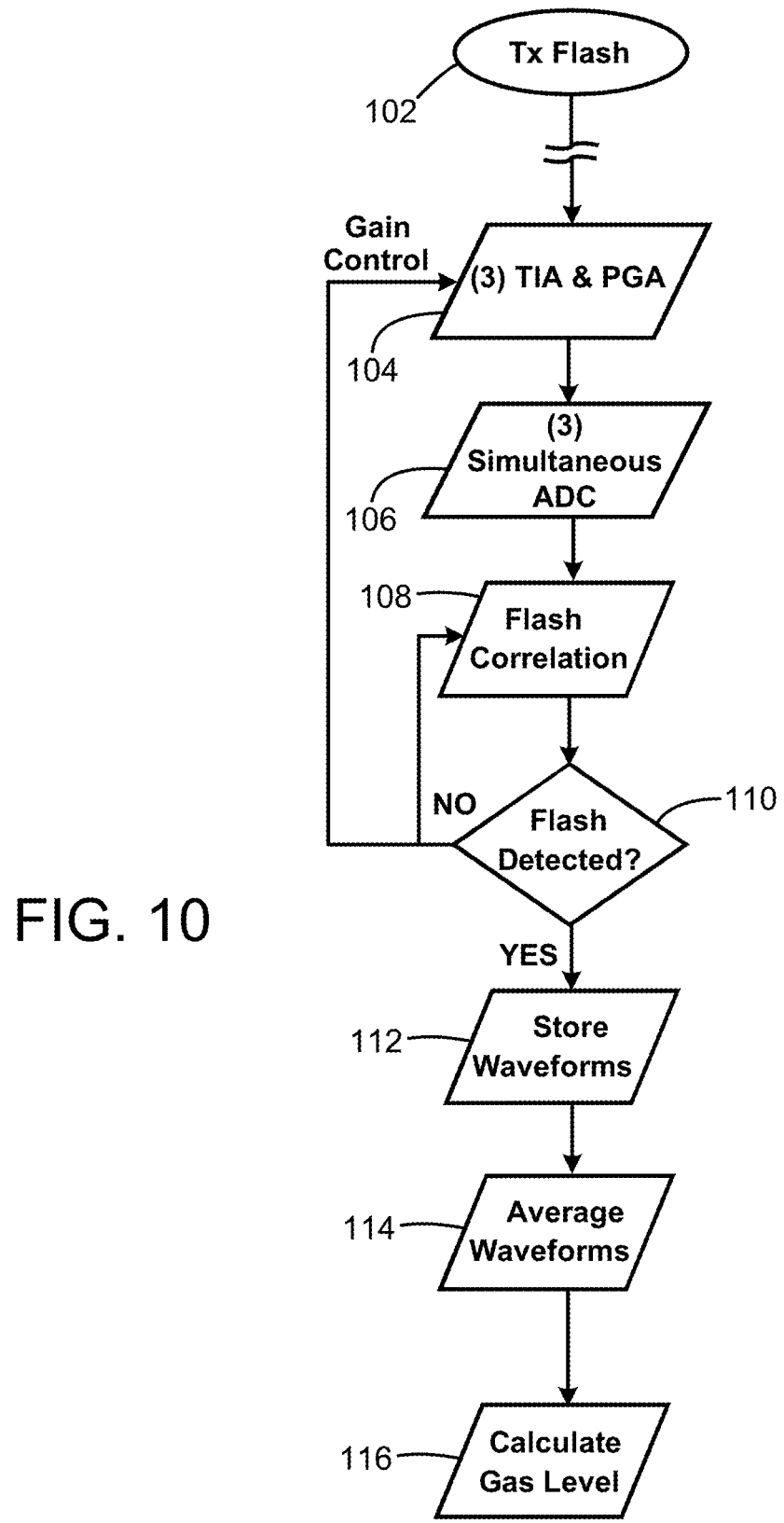
FIG. 10 illustrates an exemplary process flow diagram illustrating the operation of an exemplary embodiment of the detector.

FIG. 10 illustrates an exemplary process flow diagram illustrating the operation of the OPIR detector described above. The transmitter (30) generates an optical flash several times a second, at 102. The receiver processing is illustrated at 104-116 of FIG. 10. At 104, the transimpedance amplifiers (TIA 40-2a, 40-2b, 40-3c, FIG. 9) amplify the signals from each photodiode 40A-1a, 40A-1b, 40A-1c), The programmable gain amplifiers (PGAs 40-3a, 40-3b, 40-3c) amplifies the photodiode signals to place them in range for the ADCs 40-4a, 40-4b, 40-4c. The three amplified signals are the Sync, Sample and Reference signals.

At 106, the ADCs digitize all three signals simultaneously. The ADCs continuously provide digitized streams of data to the flash correlation block 40-5.

At 108, the flash correlation block 40-5 uses a stored ideal flash waveform to calculate a sliding flash correlation product for all three digitized signals. If the flash correlation product exceeds a calculated threshold at 110, the digitized data is considered to contain a flash waveform. If not detected, operation returns to 108. Other processes can alternatively be employed to detect the flash waveform in the digitized data.

Once a flash is detected, at 112 the digitized data associated with the flash is stored in memory in processor 40-6 for each of the three signals. Since all three signals were digitized simultaneously, at 114, the waveforms can be synchronously averaged sample-by-sample by a moving average algorithm implemented by the processor 40-5, in an exemplary embodiment. Other methods may alternatively be employed to average the Reference and Sample signals. The averaging reduces the uncorrelated noise while enhancing the correlated flash waveform.

At 116, the target gas level is calculated by the processor 40-6, based on the ratio of the average Sample signal peak to the average Reference signal peak. Other methods to calculate the gas level based upon the ratio of Sample and Reference signals. For example, the gas level could also be determined by the ratio of the area under the curve, i.e. the Sample and Reference spectrums, for both Sample and Reference. It could also be based upon the correlation product from 108 as well.

Figure 11:
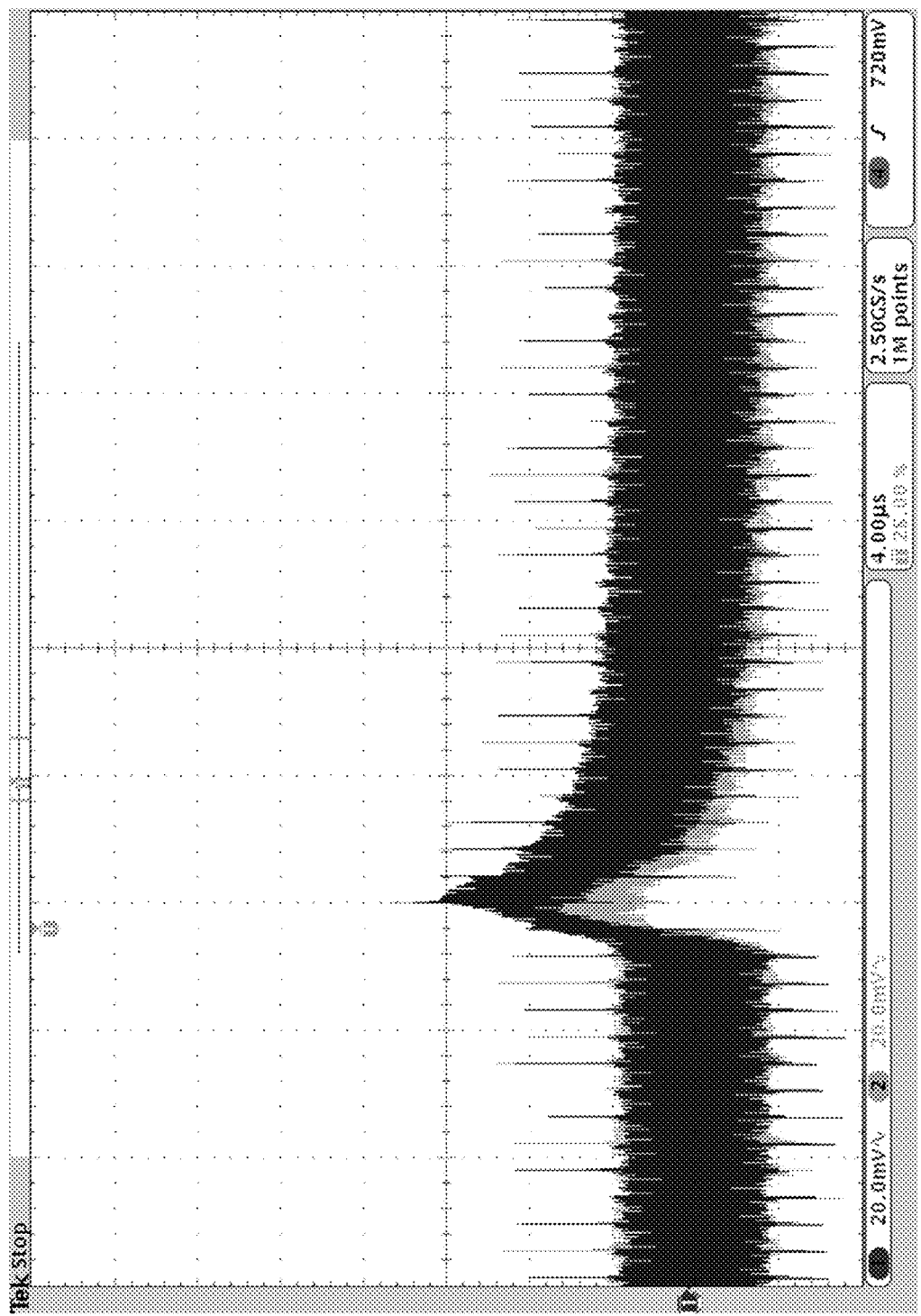
FIG. 11 graphically shows an example of noisy measurement signals without the benefit of aspects of this invention.
Figure 12:
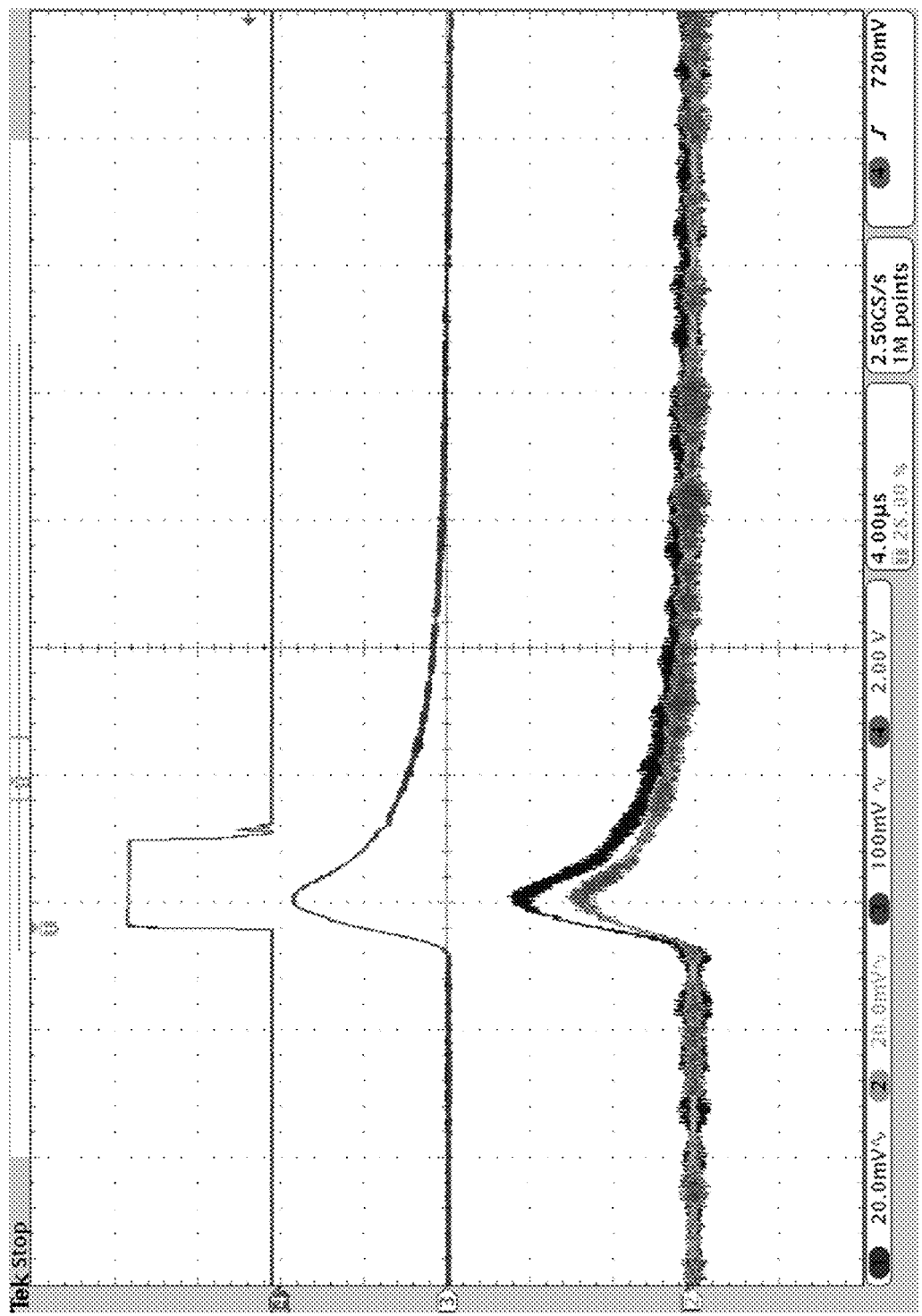
FIG. 12 shows how synchronous flash detection in accordance with aspects of the invention improves the signal to noise level of the measurement signals

The Synchronous flash detection and averaging advantage can be demonstrated by comparing FIG. 11 and FIG. 12. FIG. 11 is a waveform capture of exemplary Sample and Reference signals without any averaging occurring. FIG. 12 is the very same setup but with the Sync signal added to detect the transmitter flash that is then used to time synchronously average the Sample and Reference signals. As can be seen there is quite a reduction in noise for the Sample and Reference signals showing a benefit of this invention.

As described above, the Sync signal is the stronger signal which is an advantage during adverse conditions. On sunny days and/or short path lengths, the Sync signal will likely be unnecessary, as in that case the Sample and Reference signals will be strong, and the Sample signal may be used to detect the flash.

Although the foregoing has been a description and illustration of specific embodiments of the subject matter, various modifications and changes thereto can be made by persons skilled in the art without departing from the scope and spirit of the invention.

What is claimed is:

1. An open path gas detector for detecting the presence of a target gas with improved uptime, comprising:
    a transmitter unit comprising an optical source configured to transmit flashes of optical energy along a path in an area under surveillance, the transmitter unit configured to generate energy at a sample wavelength in a sample spectral region at which optical energy is absorbed by the target gas along the path, at a reference wavelength in a reference spectral region not significantly absorbed by the target gas, and at a synchronization wavelength in a synchronization spectral region different from the sample and reference wavelengths; and
    a receiver for receiving the transmitted energy, comprising a sample channel substantially responsive only to the energy at the sample wavelength to provide a sample signal, a reference channel responsive to energy at the reference wavelength to provide a reference signal, and a synchronization channel responsive to the energy at the synchronization wavelength in the synchronization spectral region to provide a synchronization signal, wherein the synchronization spectral region is selected such that the synchronization signal is larger than the sample and reference signals; and
    the receiver responsive to the sample, reference and synchronization signals, the receiver configured to detect the presence of the target gas in response to the sample and reference signals, and wherein the receiver is configured to synchronize operation of the receiver to the transmitter flashes using the synchronization signal.

2. The detector of claim 1, wherein the target gas is a hydrocarbon, the sample wavelength is nominally 2.3 um.

3. The detector of claim 2, wherein the reference wavelength is nominally 2.1 um.

4. The detector of claim 1, wherein the optical source includes a xenon flashlamp.

5. The detector of claim 1, wherein the receiver is further configured to capture the outputs of the sample and reference channels in synchrony to a specific point on a waveform of the output of the synchronization channel.

6. The detector of claim 5, wherein the specific point represents a fast-rising edge of the transmitter flash as detected by the synchronization channel.

7. The detector of claim 5, wherein the receiver includes a processor configured to perform synchronous averaging of the received optical flashes, wherein N values of the captured sample and reference signals are summed and the sum divided by N to obtain a mean value of the sample and reference signals.

8. The detector of claim 1, wherein the receiver includes a processor to determine the presence of the target gas by calculating ratios of the sample and reference signals.

9. The detector of claim 1, wherein the receiver includes a detection circuit responsive to the sample, reference and synchronization signals, the detection circuit configured to detect the transmitter flashes and to trigger capture of the sample and reference signals.

10. An open path gas detector for detecting the presence of a target hydrocarbon gas with improved uptime in the presence of adverse environmental conditions including fog, comprising:
    a transmitter unit comprising a flash lamp configured to transmit flashes of broadband optical energy along a path in an area under surveillance, the transmitter configured to generate energy at a sample wavelength in a sample spectrum at which optical energy is absorbed by the target gas along the path, at a reference wavelength in a reference spectrum not significantly absorbed by the target gas, and at a synchronization wavelength in a synchronization spectral region different from the sample and reference spectrums;
    wherein the synchronization spectrum is selected such that the flash lamp intensity is greater at the synchronization wavelength than at the sample wavelength; and
    a receiver for receiving the transmitted energy, comprising:
    an optical module including a main objective lens for capturing and focusing the received energy onto a beam splitter, the beam splitter splitting the received energy from the main objective lens into a sample path and a reference path, sample optics in the sample path for blocking out all but the sample spectrum for a sample photodiode, reference optics in the reference path for blocking out all but the reference spectrum for a reference photodiode, a synchronization objective lens for capturing and focusing the received energy onto a synchronization photodiode,
    receiver circuitry responsive to signals from the sample, reference and synchronization photodiodes to amplify and digitize the respective signals;
    a flash detection and waveform capture circuitry responsive to the respective sample, reference and synchronization signals, wherein the synchronization signal is used to detect the transmitter flashes and to capture waveforms representative of sample and reference photodiode signals;
    a processor responsive to the captured waveforms to detect the presence of the target gas; and
    wherein the receiver is configured to synchronize operation of the receiver to the transmitter flashes using the synchronization signal.

11. The detector of claim 10, wherein the receiver is further configured to capture the sample and reference waveforms in synchrony to a specific point on a waveform of the synchronization signal.

12. The detector of claim 11, wherein the specific point represents a fast-rising edge of the transmitter flash as detected by the synchronization flash detection and waveform capture circuitry.

13. The detector of claim 10, wherein the processor is configured to perform synchronous averaging of the received optical flashes, wherein N values of the captured sample and reference signals are summed and the sum divided by N to obtain a mean value of the sample and reference signals.

14. The detector of claim 10, wherein the processor is configured to determine the presence of the target gas by calculating ratios of the sample and reference signals.

15. An open path gas detector for detecting the presence of a target gas with improved uptime, comprising:
- a transmitter unit comprising an optical source configured to transmit flashes of optical energy along a path in an area under surveillance, the transmitter configured to generate energy at detection spectral regions employed to detect the presence of the target gas including a sample spectral region at which optical energy absorbed by the target gas along the path and a reference spectral region at which optical energy is not absorbed by the target gas, and a synchronization spectral region unused by the detection; and
- a receiver for receiving the transmitted energy, comprising
- sample and reference channels responsive respectively only to received energy within the detection spectral regions and to provide a sample signal and a reference signal, and a synchronization channel responsive to the energy within the synchronization spectral region to provide a synchronization signal, wherein the synchronization spectral region is selected such that the synchronization signal is larger than the sample and reference signals; and
- the receiver configured to detect the presence of the target gas in response to the sample and reference signals, and wherein the receiver is configured to synchronize operation of the receiver to the transmitter flashes using the synchronization signal.

16. The detector of claim 15, wherein the optical source includes a xenon flashlamp.

17. The detector of claim 15, wherein the receiver is further configured to capture the sample and reference signals in synchrony to a specific point on a waveform of the synchronization signal.

18. The detector of claim 17, wherein the specific point represents a fast-rising edge of the transmitter flash.

19. The detector of claim 17, wherein the receiver is configured to perform synchronous averaging of the received optical flashes, wherein N values of the captured sample and reference signals are summed and the sum divided by N to obtain a mean value of the sample and reference signals.

20. The detector of claim 15, wherein the target gas is a hydrocarbon, the sample spectral region encompasses 2.3 um wavelength.

* * * * *